(12) United States Patent
Azuma et al.

(10) Patent No.: US 12,023,808 B2
(45) Date of Patent: Jul. 2, 2024

(54) ROBOT SYSTEM

(71) Applicant: Kawasaki Jukogyo Kabushiki Kaisha, Kobe (JP)

(72) Inventors: Kentaro Azuma, Kobe (JP); Takayuki Ishizaki, Kakogawa (JP); Mitsunobu Oka, Kobe (JP); Masataka Yoshida, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 569 days.

(21) Appl. No.: 17/211,827

(22) Filed: Mar. 25, 2021

(65) Prior Publication Data

US 2021/0205989 A1 Jul. 8, 2021

Related U.S. Application Data

(63) Continuation of application No. PCT/JP2019/033354, filed on Aug. 26, 2019.

(30) Foreign Application Priority Data

Sep. 25, 2018 (JP) ................. 2018-178814

(51) Int. Cl.
*B25J 9/16* (2006.01)
*B25J 9/04* (2006.01)
(Continued)

(52) U.S. Cl.
CPC ............ *B25J 9/1612* (2013.01); *B25J 9/043* (2013.01); *B25J 15/0253* (2013.01); *B25J 15/0691* (2013.01); *G06T 7/60* (2013.01)

(58) Field of Classification Search
CPC ...... B25J 9/1612; B25J 9/043; B25J 15/0253; B25J 15/0691; G06T 7/60
See application file for complete search history.

(56) References Cited

U.S. PATENT DOCUMENTS

| 10,836,046 B2 | 11/2020 | Brudniok et al. |
| 2009/0173560 A1* | 7/2009 | Nakamoto ............. B25J 9/1612 |
| | | 700/259 |

(Continued)

FOREIGN PATENT DOCUMENTS

| CN | 101360588 A | 2/2009 |
| CN | 204160486 U | 2/2015 |

(Continued)

OTHER PUBLICATIONS

Chinese Search Report dated Apr. 28, 2023 in corresponding Chinese Patent Application No. 201980062299.4 (English translation only), 2 pages.

*Primary Examiner* — Kira Nguyen
(74) *Attorney, Agent, or Firm* — XSENSUS LLP

(57) ABSTRACT

A robot system includes two arms, each having a hand at an end thereof, and a controller to control operation of the arms. The hand has an openable and closable holder. The controller includes hand-number determining circuitry to determine the number of hands used to hold a holdable object based on the size of the holdable object, and hold controlling circuitry to control the holder of one of the hands to open so as to hold the holdable object by an inner surface of the holder, when the number of hands to be used is one, and control the holders of the two hands to close so as to hold the holdable object by outer surfaces of the two holders, when the number of hands to be used is two.

20 Claims, 16 Drawing Sheets

(51) Int. Cl.
   *B25J 15/02*     (2006.01)
   *B25J 15/06*     (2006.01)
   *G06T 7/60*      (2017.01)

(56) References Cited

U.S. PATENT DOCUMENTS

| | | | | |
|---|---|---|---|---|
| 2012/0004774 A1* | 1/2012 | Umetsu | .................. | B25J 9/1697 |
| | | | | 700/254 |
| 2012/0059517 A1* | 3/2012 | Nomura | ............... | B25J 15/0004 |
| | | | | 901/31 |
| 2014/0102239 A1* | 4/2014 | Umeno | .................. | B25J 9/0087 |
| | | | | 294/213 |
| 2015/0251321 A1* | 9/2015 | Ishikawa | .............. | B25J 15/0047 |
| | | | | 294/183 |
| 2016/0272354 A1 | 9/2016 | Nammoto et al. | | |

FOREIGN PATENT DOCUMENTS

| | | |
|---|---|---|
| CN | 207273251 U | 4/2018 |
| DE | 10 2015 216 550 A1 | 3/2017 |
| JP | 2007-260837 A | 10/2007 |
| JP | 2014-121742 A | 7/2014 |
| WO | 2007/088735 A1 | 8/2007 |

* cited by examiner

ROBOT SYSTEM

CROSS-REFERENCE TO RELATED APPLICATIONS

The present application claims priority to PCT/JP2019/033354, filed Aug. 26, 2019, which claims priority to JP 2018-178814, filed Sep. 25, 2018, the entire contents of each are incorporated herein by its reference.

TECHNICAL FIELD

The present disclosure relates to a robot system which holds a holdable object, such as a box body, by a robot hand so as to change a position of the holdable object.

BACKGROUND ART

Conventionally, robot systems which hold a holdable object, such as a box body and a package, by a robot hand so as to change the position of the holdable object, are known. One example of such robot systems holds the holdable object placed on a tray and transfers it onto another tray.

DESCRIPTION OF THE DISCLOSURE

Summary of the Disclosure

A robot system according to one aspect of the present disclosure includes two arms, each having a hand at an end thereof, and a robot controlling module or circuitry configured to control operation of the arms. The hand has an openable and closable holding part. The robot controlling module or circuitry includes a hand-number determining module or circuitry configured to determine the number of hands used to hold a holdable object based on the size of the holdable object, and a hold controlling module or circuitry configured to control the holding part of one of the hands to open so as to hold the holdable object by an inner surface of the holder, when the number of hands determined by the hand-number determining module or circuitry is one, and control the holding parts of the two hands to close so as to hold the holdable object by outer surfaces of the two holders, when the number of hands determined by the hand-number determining module or circuitry is two.

BRIEF DESCRIPTION OF DRAWINGS

FIG. 3(A) is a plan view, and FIG. 3(B) is a front view.

FIG. 5(A) is a plan view, and FIG. 5(B) is a front view.

FIG. 7(A) is a plan view, and FIG. 7(B) is a front view.

FIGS. 9 (A) and 9(B) are enlarged views illustrating a sucking mechanism of the third hand illustrated in FIG. 8, where

FIG. 10(A) is a plan view, and FIG. 10(B) is a front view.

FIG. 11(A) is a plan view, and FIG. 11(B) is a front view.

FIG. 12(A) is a plan view, and FIG. 12(B) is a front view.

FIG. 13(A) is a plan view, and FIG. 13(B) is a cross-sectional view taken along a line XIII-XIII in FIG. 13(A).

FIG. 14(A) is a front view when holding the holdable object only by the sucking function, and FIG. 14(B) is a front view when holding the holdable object by both of the sucking function and a holding function.

FIG. 15(A) is a front view when holding the holdable object only by the sucking function, and FIG. 15(B) is a front view when holding the holdable object by both of the sucking function and the holding function.

MODE FOR CARRYING OUT THE DISCLOSURE

Figure 1:
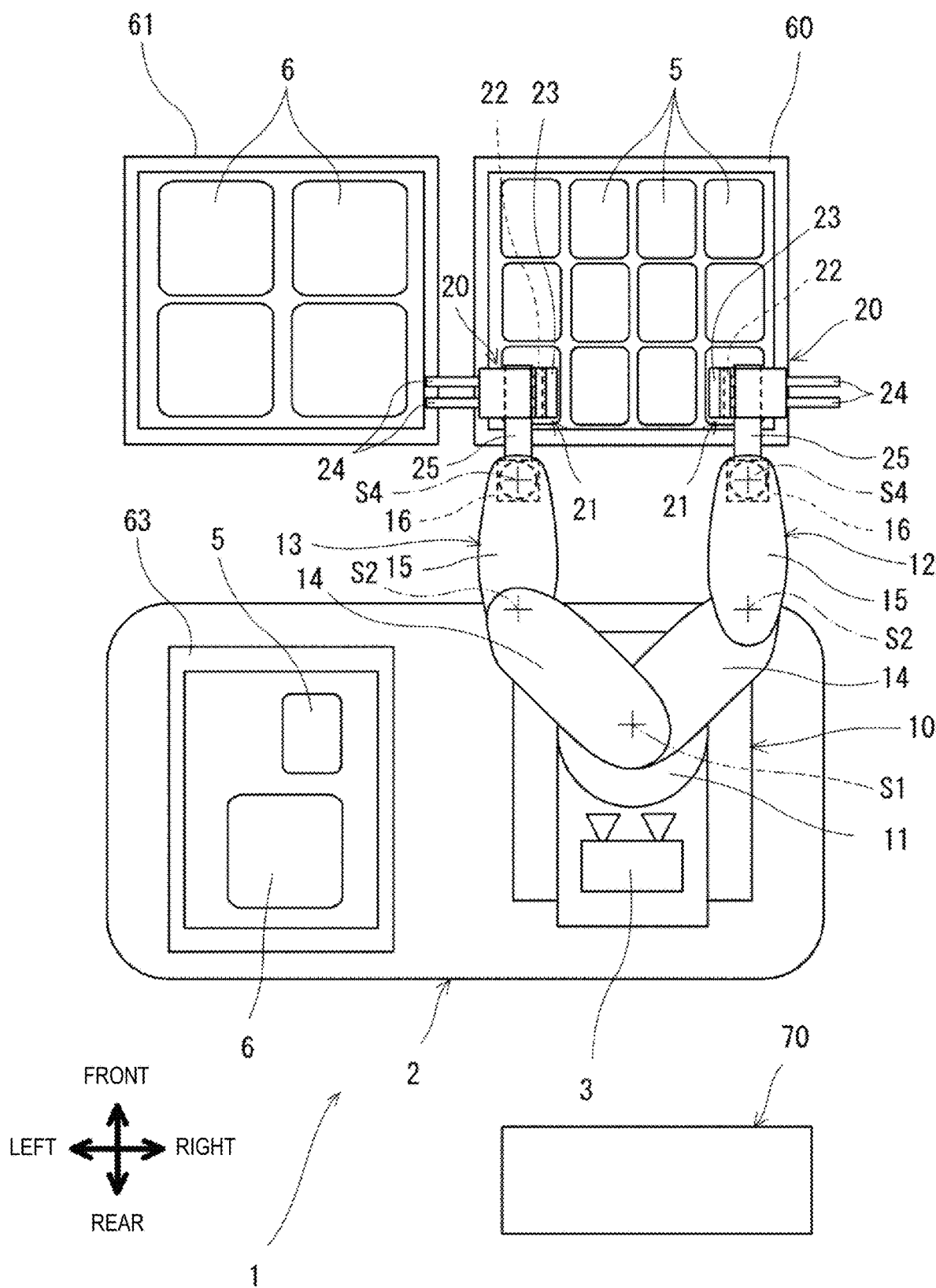
FIG. 1 is a plan view illustrating a robot system according to one embodiment of the present disclosure.

Hereinafter, one embodiment of the present disclosure is described with reference to the accompanying drawings. The following embodiment describes a robot system 1 having a dual-arm robot 10 as one example. Moreover, a smaller holdable object 5 which is held by one hand (hereinafter, may also be referred to as a "first holdable object 5"), and a larger holdable object 6 which is held by both hands (hereinafter, may also be referred to as a "second holdable object 6"), are described as examples. The holdable objects are not limited to two types, but may be more than two types. Moreover, one arm 12 (13) may be referred to as "one arm," two arms 12 and 13 may be referred to as "both arms," a hand 20 may be referred to as "one hand," and two hands 20 may be referred to as "both hands." A "front-and-rear direction" and a "left-and-right direction" as used herein and in the appended claims correspond to a front-and-rear direction and a left-and-right direction in a plan view illustrated in FIG. 1, respectively.

(Configuration of Robot System)

Figure 2:
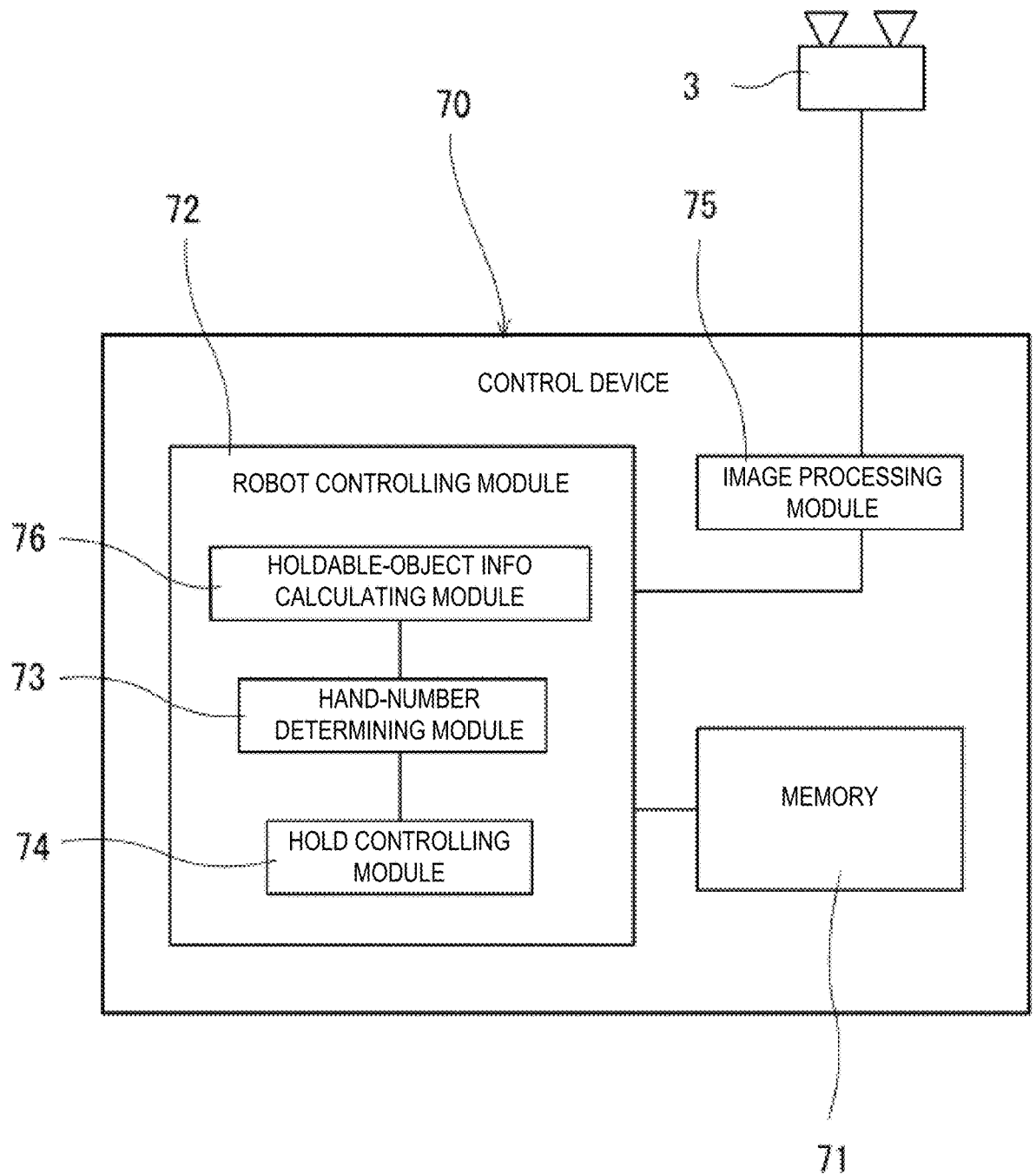
FIG. 2 is a block diagram illustrating functions provided to a control device of the robot system illustrated in FIG. 1.
Figure 3A:
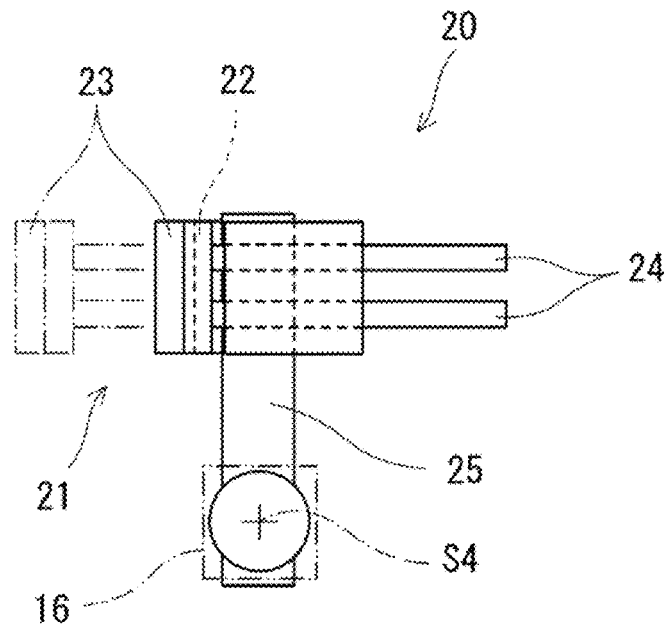
FIGS. 3(A) and 3(B) are views illustrating a first hand of the robot system illustrated in FIG. 1, where
Figure 3B:
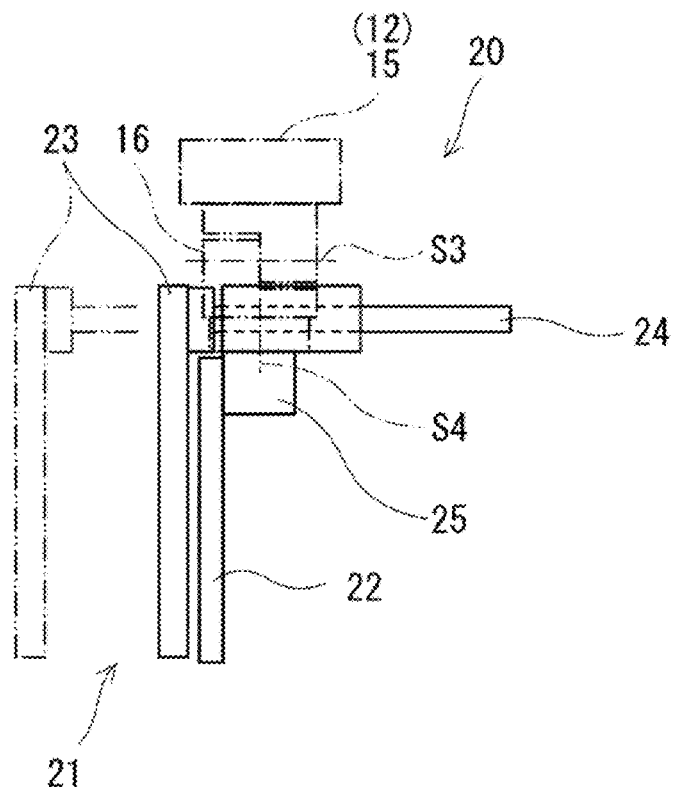

FIG. 1 is a plan view illustrating the robot system 1 according to one embodiment. FIG. 2 is a block diagram illustrating functions provided to a control device, circuitry, or robot controller 70 of the robot system 1 illustrated in FIG. 1. FIGS. 3(A) and 3(B) are views illustrating the hand 20 of the robot system 1 illustrated in FIG. 1, where FIG. 3(A) is a plan view, and FIG. 3(B) is a front view.

The robot 10 according to this embodiment has two arms of the first arm 12 (right arm) and the second arm 13 (left arm). The two arms 12 and 13 are configured as a dual arm which is rotatable about a vertical first axis S1 defined on a pedestal 11. Each of the two arms 12 and 13 has a first link 14, a second link 15, and a third link 16. The first link 14 is horizontally rotatable about the first axis S1 defined on the pedestal 11. The second link 15 is horizontally rotatable about a vertical second axis S2 defined at an end part of the first link 14. The third link 16 is provided below an end part of the second link 15. The third link 16 is comprised of a member pivotable about a horizontal third axis S3 perpendicular to the drawing sheet (See FIGS. 3(A) and 3(B)). The number of movable axes of the robot 10 is not limited to this example.

Then, the first hand 20 is provided to an end part of the third link 16. The first hand 20 is adjustable of its vertical position by the structural member of the third link 16 vertically pivoting about the third axis S3. The first hand 20 is horizontally rotatable with respect to the third link 16 about a vertical fourth axis S4. Since the first hand 20 of the first arm 12 and the first hand 20 of the second arm 13 have symmetrically the same configurations, the same reference characters are given to them. Details of the first hand 20 will be described later.

Since the robot 10 is configured as a dual-arm type provided to one pedestal 11, it can efficiently hold in a small installation space the first holdable object 5 by one of the first arm 12 and the second arm 13, and the second holdable object 6 by both of the first arm 12 and the second arm 13, according to the sizes of the holdable objects 5 and 6.

Moreover, in this embodiment, a stereo camera 3 is provided near the robot 10. This stereo camera 3 is installed at a location where it can image the holdable object 5 (6). For example, the stereo camera 3 may be provided above the pedestal 11 on the rear side. Since the stereo camera 3 is provided, the holdable object 5 (6) can be imaged three dimensionally. By the holdable object 5 (6) being imaged three dimensionally, the size of the holdable object 5 (6) can be calculated based on an image analysis as described later.

The robot system 1 is further provided with the control device 70 which controls the robot system 1. The control device 70 includes a processor, a volatile memory, a non-volatile memory, and an input/output interface which constitutes a reception part and an output part. This control device 70 may be considered circuitry or processing circuitry, and the very modules of control device 70 may each be considered circuitry or processing circuitry.

As illustrated in FIG. 2, the control device 70 includes a memory 71 and a robot controlling module or circuitry 72. The memory 71 is implemented by the volatile memory and the non-volatile memory. The robot controlling module 72 is implemented by the processor calculating by using the volatile memory coordinates of reference positions of the links 14 to 16 and the first hands 20, respectively, based on a program stored in the non-volatile memory. The robot controlling module 72 outputs an operating amount of each of the first arm 12 and the second arm 13 to a corresponding driving part based on the calculated coordinates, and also calculates the coordinates of the first arm 12 and the second arm 13 based on an operation signal received from the corresponding driving parts. The control device 70 also controls turning of the pedestal 11.

Moreover, the robot controlling module 72 includes a hand-number determining module or circuitry 73 which determines the number of first hands 20 to be used which hold the holdable object 5 (6) based on the size of the holdable object 5 (6). The robot controlling module 72 includes a hold controlling module or circuitry 74. When the number of first hands 20 determined by the hand-number determining module 73 is one, the hold controlling module 74 opens a holding part or holder 21 of one first hand 20 so as to hold the first holdable object 5 by the one first hand 20. When the number of first hands 20 determined by the hand-number determining module 73 is two, the hold controlling module 74 closes the holding parts 21 of the respective first hands 20 so as to hold the second holdable object 6 by the two first hands 20. The hold controlling module 74 controls the opening and closing of both holding parts 21.

Moreover, the control device 70 is provided with an image processing module or circuitry 75 which analyzes the image of the holdable object captured by the stereo camera 3. The robot controlling module 72 calculates by a holdable-object information calculating module or circuitry 76 at least the size of the holdable object 5 (6) based on the image processed by the image processing module 75, and determines by the hand-number determining module 73 the number of first hands 20 to be used based on the calculated size of the holdable object 5 (6). The shape of the holdable object 5 (6) may be calculated by the image processing module 75. According to this, the size of the holdable object 5 (6) is calculated based on the image captured by the stereo camera 3, and the robot controlling module 72 can determine, according to the size of the holdable object 5 (6), whether to hold it by one first hand 20 or by two first hands 20, and thus, the holdable object 5 (6) can be efficiently held.

As illustrated in FIG. 1, in this embodiment, the robot 10 picks up one first holdable object 5 of smaller size from a first tray 60, picks up one second holdable object 6 of larger size from a second tray 61, and changes their positions (transfers them) onto a third tray 63. A plurality of first holdable objects 5 are lined up on the first tray 60, and a plurality of second holdable objects 6 are lined up on the second tray 61. Therefore, the holding part 21 of the robot 10 of this embodiment is configured as a plate member or plate which can be inserted at its end part between the aligned objects 5 (6). In this embodiment, the robot 10 and the third tray 63 are disposed on an automated guided vehicle 2, and can be transferred by the automated guided vehicle 2 after a certain object 5 and/or 6 is placed on the third tray 63. Note that an operator may remotely operate the two first hands 20 while watching the image captured by the stereo camera 3.

Details of the first hand 20 is described with reference to FIGS. 3(A) and 3(B). Note that in the following description the first hand 20 of the first arm 12 is described. The first hand 20 has a fourth link 25 attached to the third link 16 at its base part, and horizontally rotatable about the fourth axis S4. The fourth link 25 is provided with the holding part 21 at its end part.

The holding part 21 includes a fixed plate 22 as a holding plate provided to the fourth link 25, and a movable plate 23 as a holding plate which is opened to be separated from the fixed plate 22. In this embodiment, the fixed plate 22 and the movable plate 23 are plate members or plates each formed in a spatula shape at its end part. The movable plate 23 parallelly opens and closes while facing to the fixed plate 22. The movable plate 23 is opened and closed by holding cylinders 24 provided to the fourth link 25. The movable plate 23 can be opened so as to be separated from the fixed plate 22 by the cylinders 24 being expanded (the state illustrated by a two-dot chain line). The movable plate 23 can be closed to approach the fixed plate 22 (including a contacting state) by the cylinders 24 being contracted.

Such a robot system 1 selects whether to use one first hand 20 or two first hands 20 when holding the holdable objects 5 and 6 having different sizes. Therefore, the holdable objects 5 and 6 can be efficiently held and transferred as described below.

(Mode of Using One Arm)

Figure 4:
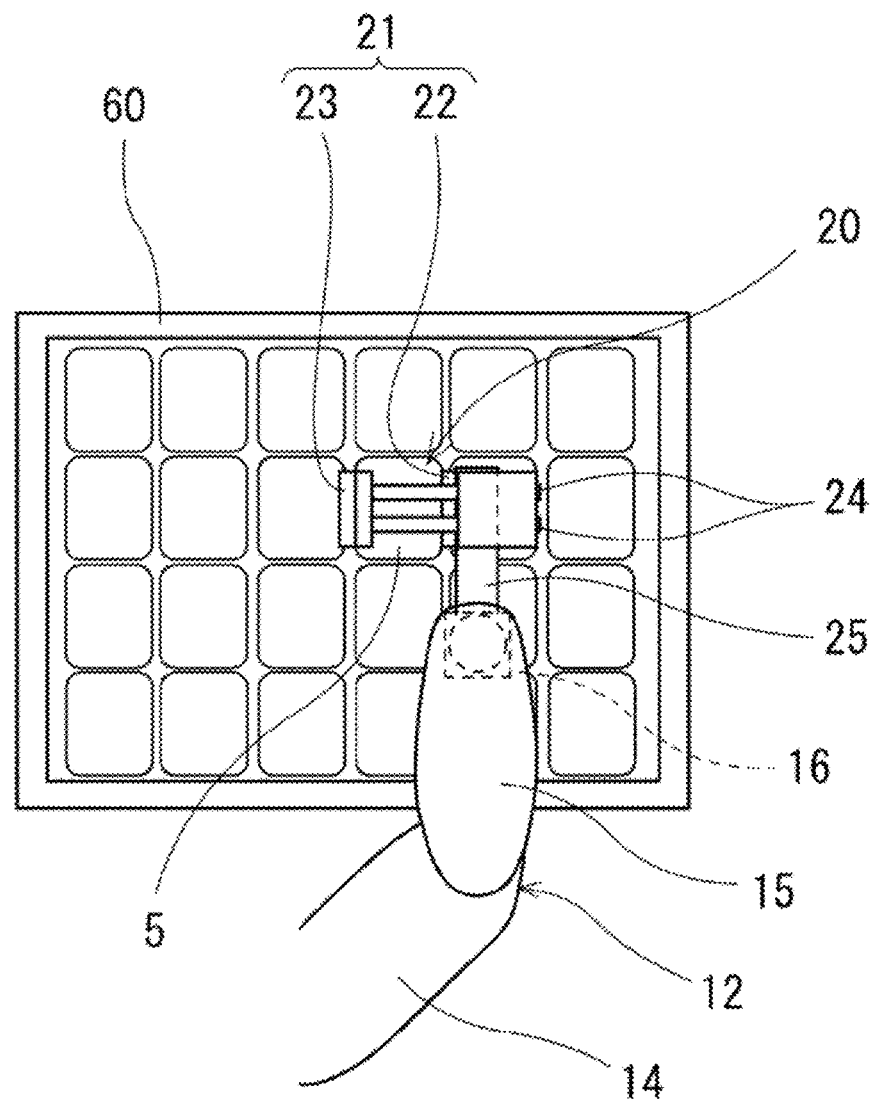
FIG. 4 is a plan view illustrating a state in which a smaller holdable object is held by one hand of the robot system illustrated in FIG. 1.
Figure 5A:
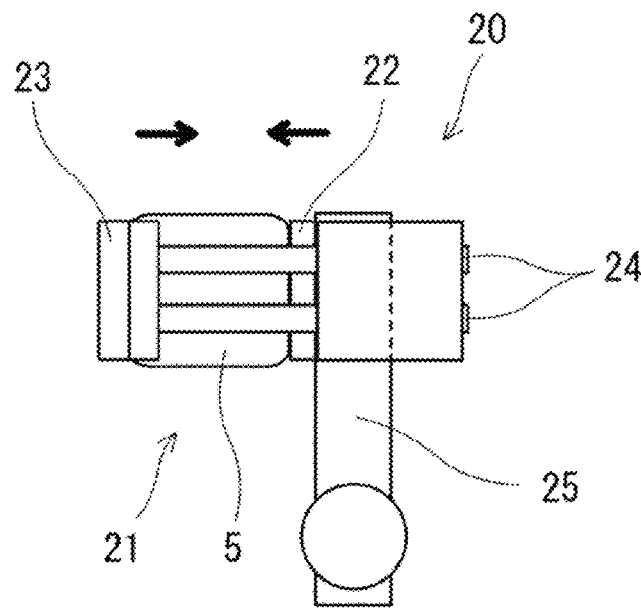
FIGS. 5(A) and 5(B) are detailed views of the state illustrated in FIG. 4 in which the holdable object is held by one hand, where
Figure 5B:
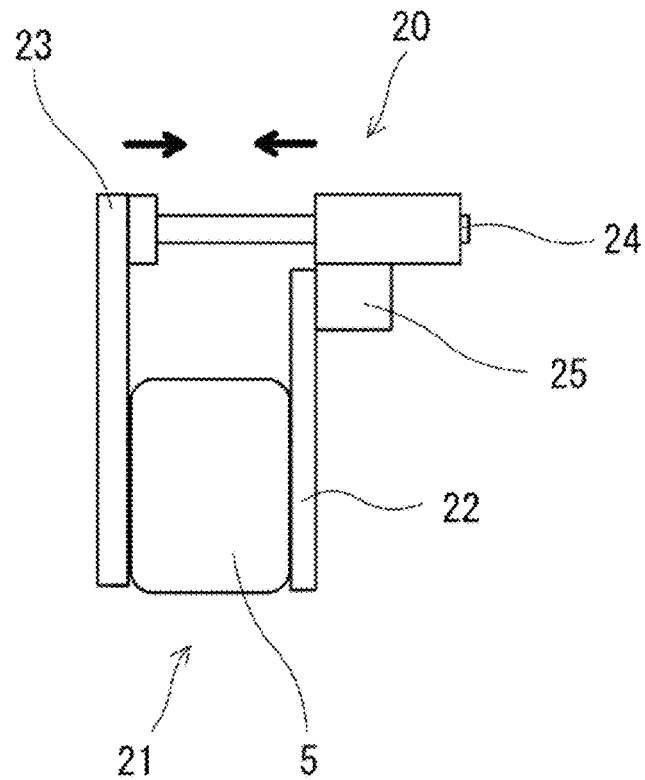

FIG. 4 is a plan view illustrating a state where the smaller first holdable object 5 is held by one hand of the robot system 1 illustrated in FIG. 1. FIGS. 5(A) and 5(B) are detailed views illustrating the state in FIG. 4 in which the first holdable object 5 is held by one hand, where FIG. 5(A) is a plan view, and FIG. 5(B) is a front view.

As illustrated in the drawings, the smaller first holdable object 5 placed on the first tray 60 (e.g., a box body of a cellular phone) is held from its side surfaces by the holding part 21 provided to one first hand 20. In detail, the movable plate 23 of the holding part 21 is opened and separated from the fixed plate 22 by the holding cylinders 24, and positioned so that the movable plate 23 and the fixed plate 22 can sandwich the first holdable object 5 therebetween from the side surfaces of the first holdable object 5. Then, the holding cylinders 24 are contracted so that the first holdable object 5 is sandwiched and held. A holding force for holding the first holdable object 5 can be appropriately adjusted based on feedback of a reaction force acting on the holding cylinders 24. Moreover, since the holding part 21 is comprised of the fixed plate 22 and the movable plate 23 each having a plate shape, the holding part 21 is thin. Therefore, even when the plurality of first holdable objects 5 are lined up, each of the fixed plate 22 and the movable plate 23 can be inserted between the aligned first holdable objects 5 so as to hold it. That is, even when the first holdable objects 5 are aligned with small gaps therebetween, the fixed plate 22 and the movable plate 23 in the plate shape can be inserted into the gaps so as to appropriately hold the first holdable object 5.

The first holdable object 5 held by the holding part 21 of one hand is transferred to a given position by one arm 12 (13).

As described above, when the smaller first holdable object 5 is held by one arm 12 (13), the holding part 21 is opened so that the fixed plate 22 and the movable plate 23 sandwich and hold the first holdable object 5 therebetween by their inner surfaces. Therefore, the first holdable object 5 can be promptly held and changed in its position. Although in the drawings the first arm 12 (right arm) holds the first holdable object 5, the second arm 13 (left arm) may hold the first holdable object 5, or both of the first arm 12 and the second arm 13 may hold the first holdable objects 5, respectively.

(Mode of Using Two Arms)

Figure 6:
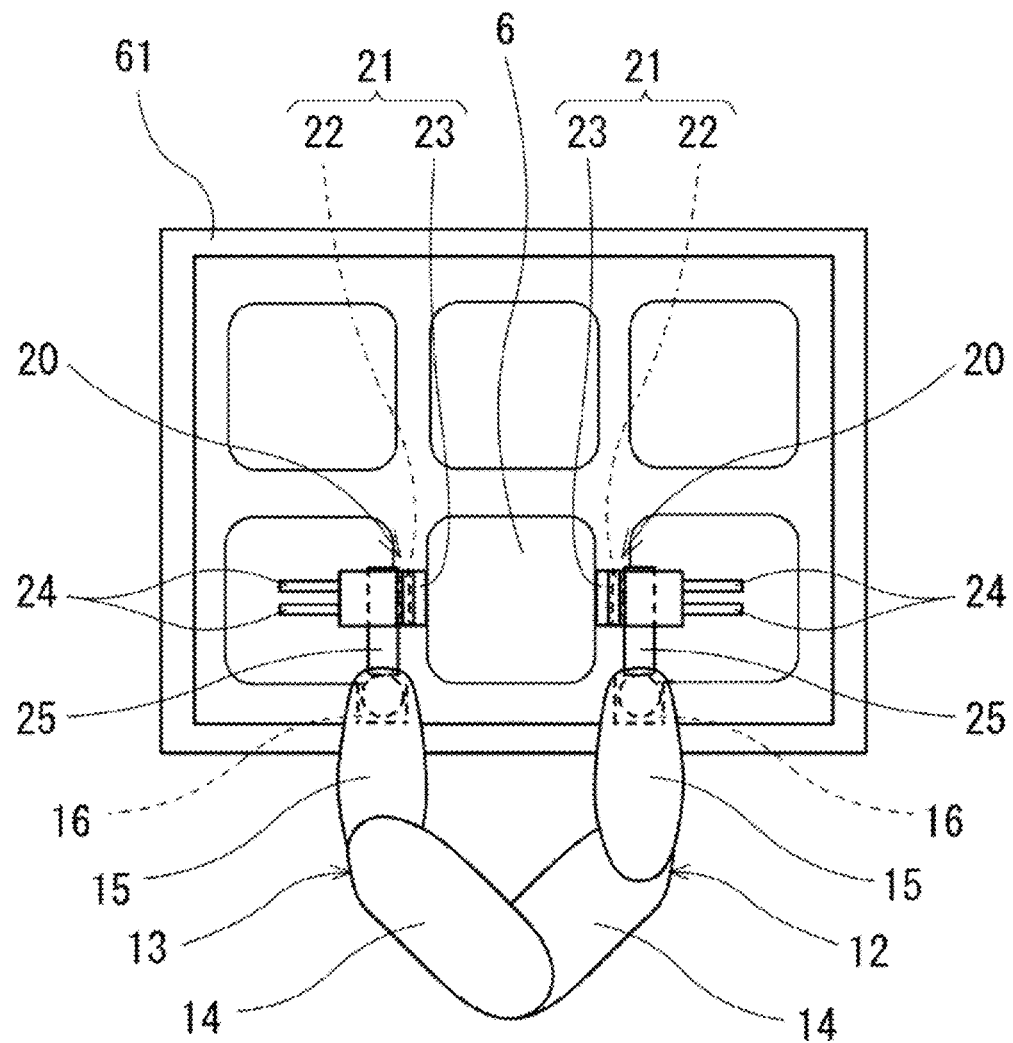
FIG. 6 is a plan view illustrating a state in which a larger holdable object is held by both hands of the robot system illustrated in FIG. 1.
Figure 7A:
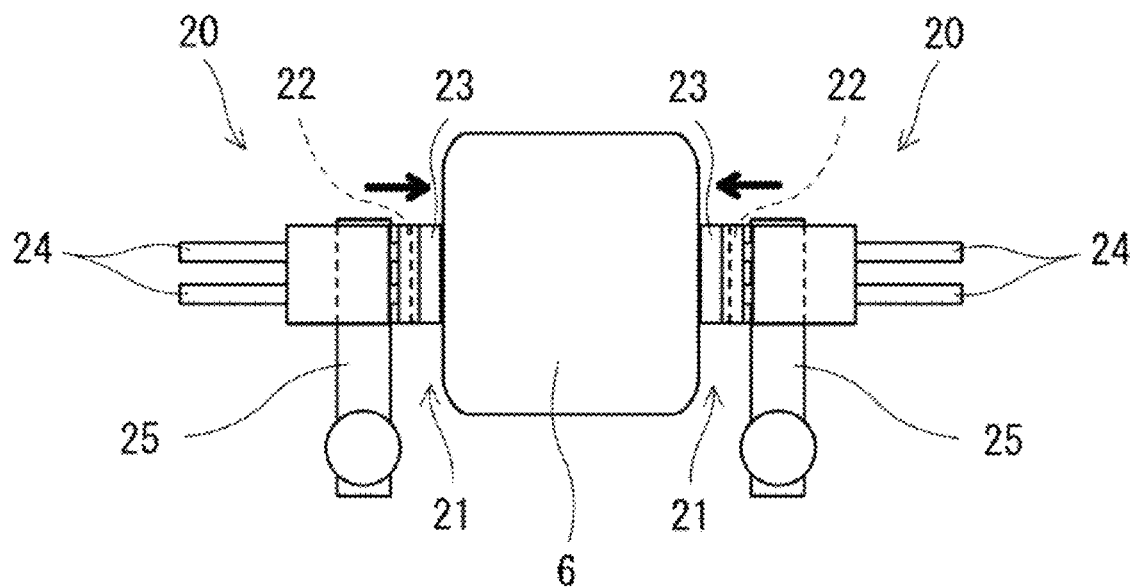
FIGS. 7(A) and 7(B) are detailed views of the state illustrated in FIG. 6 in which the holdable object is held by both hands, where
Figure 7B:
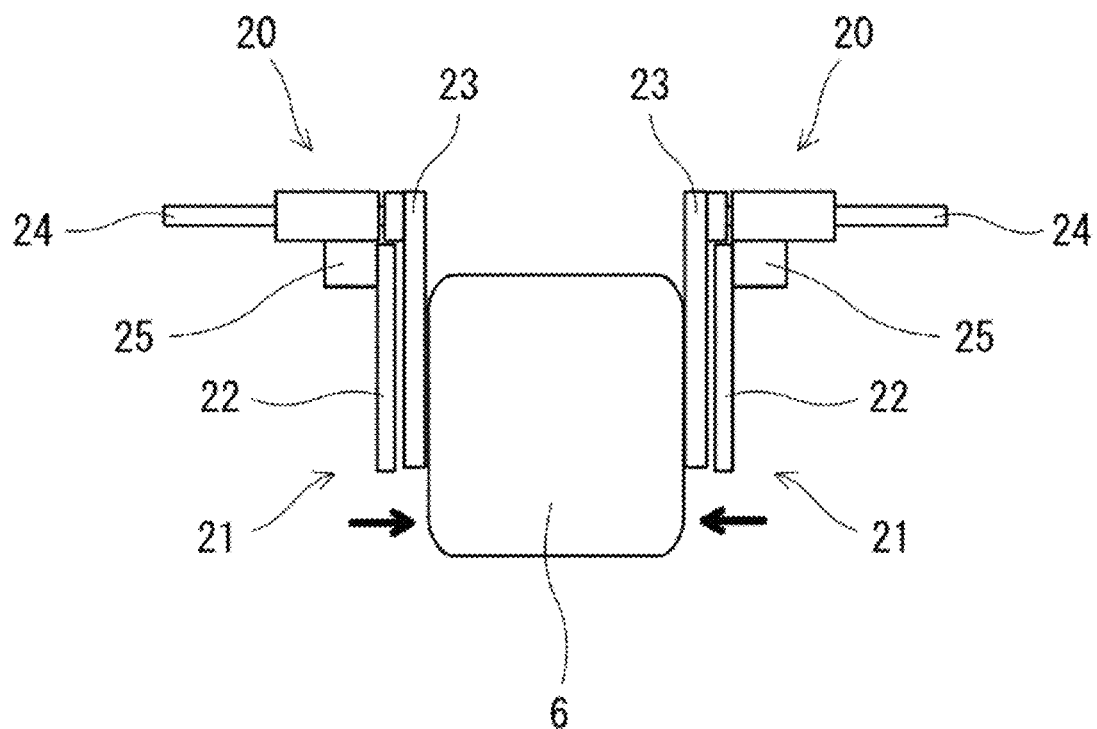

FIG. 6 is a plan view illustrating a state where the larger second holdable object 6 is held by both hands of the robot system 1 illustrated in FIG. 1. FIGS. 7(A) and 7(B) are detailed views of the state illustrated in FIG. 6 in which the second holdable object 6 is held by both hands, where FIG. 7(A) is a plan view, and FIG. 7(B) is a front view.

As illustrated in the drawings, the larger second holdable object 6 placed on the second tray 61 (e.g., a box body of shoes) is held from its side surfaces by the holding parts 21 provided to the first arm 12 and the second arm 13, respectively. In detail, the movable plates 23 of the holding parts 21 are approached to the fixed plates 22 and closed by the holding cylinders 24, respectively, and the two holding parts 21 are positioned so that they can sandwich the second holdable object 6 from the side surfaces of the second holdable object 6 by outer surfaces of the respective movable plates 23. Then, the holding parts 21 of the first arm 12 and the second arm 13 sandwich the second holdable object 6 therebetween while each holding part 21 being closed. A holding force for holding the second holdable object 6 can be appropriately adjusted based on feedback of a reaction force acting on the second links 15. Moreover, since the holding part 21 is comprised of the fixed plate 22 and the movable plate 23 each having a plate shape, the holding part 21 is thin even when being closed. Therefore, even when the plurality of second holdable objects 6 are lined up, the holding parts 21 can be inserted between the aligned second holdable objects 6, respectively, so as to hold it. That is, even when the second holdable objects 6 are aligned with small gaps therebetween, the holding parts 21 in the plate shape can be inserted into the gaps, respectively, so as to appropriately hold the second holdable object 6. The second holdable object 6 held by the holding parts 21 of both hands is transferred to a given position by two of the first arm 12 and the second arm 13.

As described above, when the second holdable object 6 is held by the two arms 12 and 13, it is held by the outer surfaces of the two movable plates 23 while the holding parts 21 are closed. Therefore, the second holdable object 6 can be promptly held and changed in its position.

(Example of Second Hand with Sucking Function)

Figure 8:
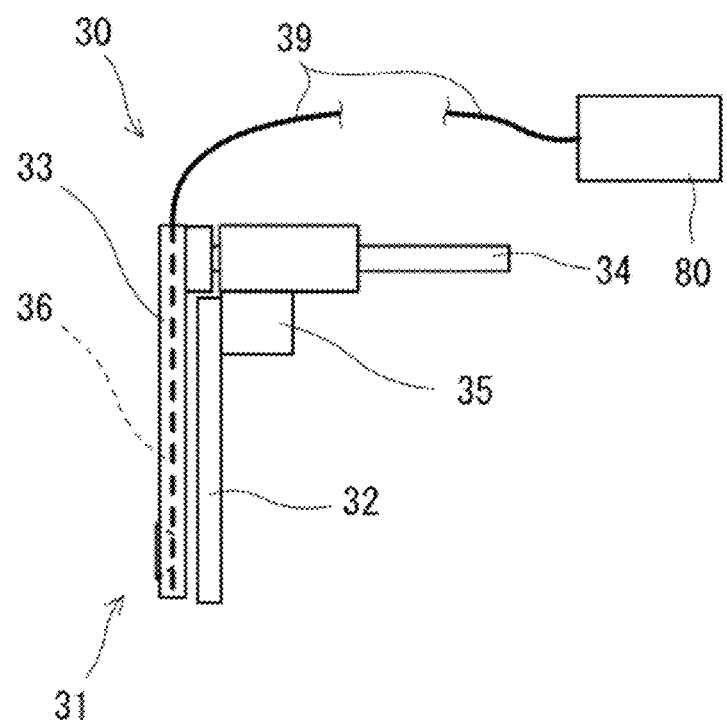
FIG. 8 is a front view illustrating a second hand, which is the first hand illustrated in FIGS. 3(A) and 3(B) additionally provided with a sucking function.
Figure 9A:
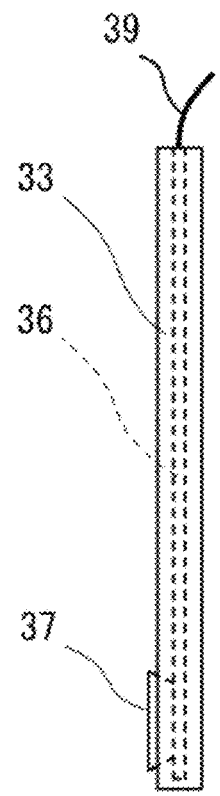
FIG. 9(A) is a front view of Example 1.
Figure 9B:
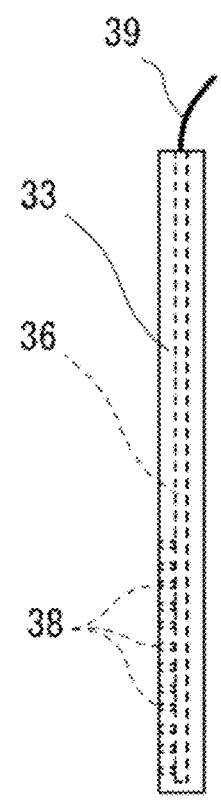
FIG. 9(B) is a front view of Example 2.
Figure 10A:
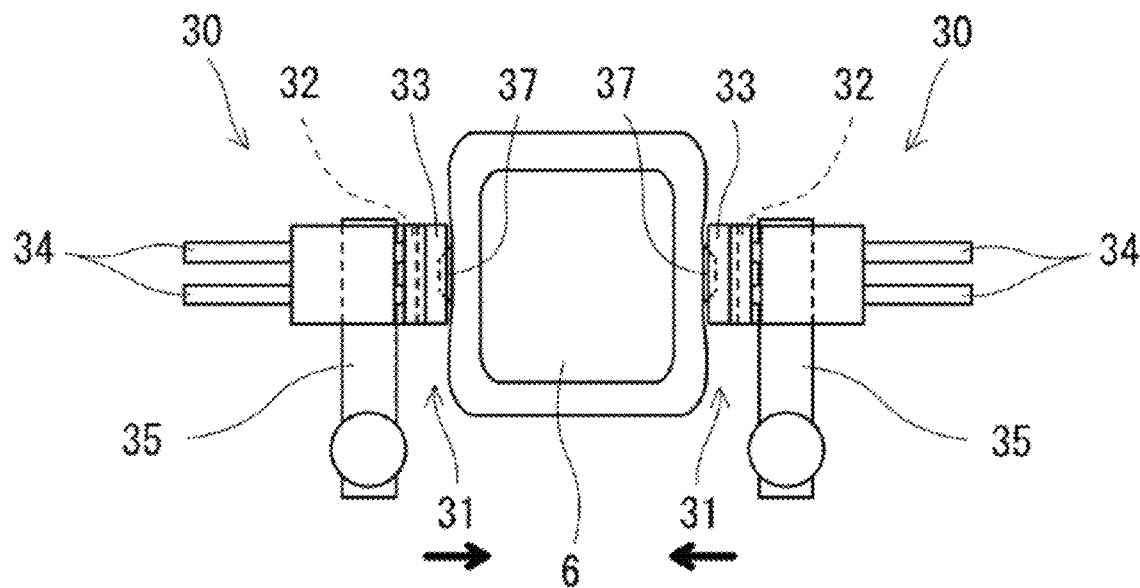
FIGS. 10(A) and 10(B) are views illustrating a state in which the second hands illustrated in FIG. 8 hold the holdable object, where
Figure 10B:
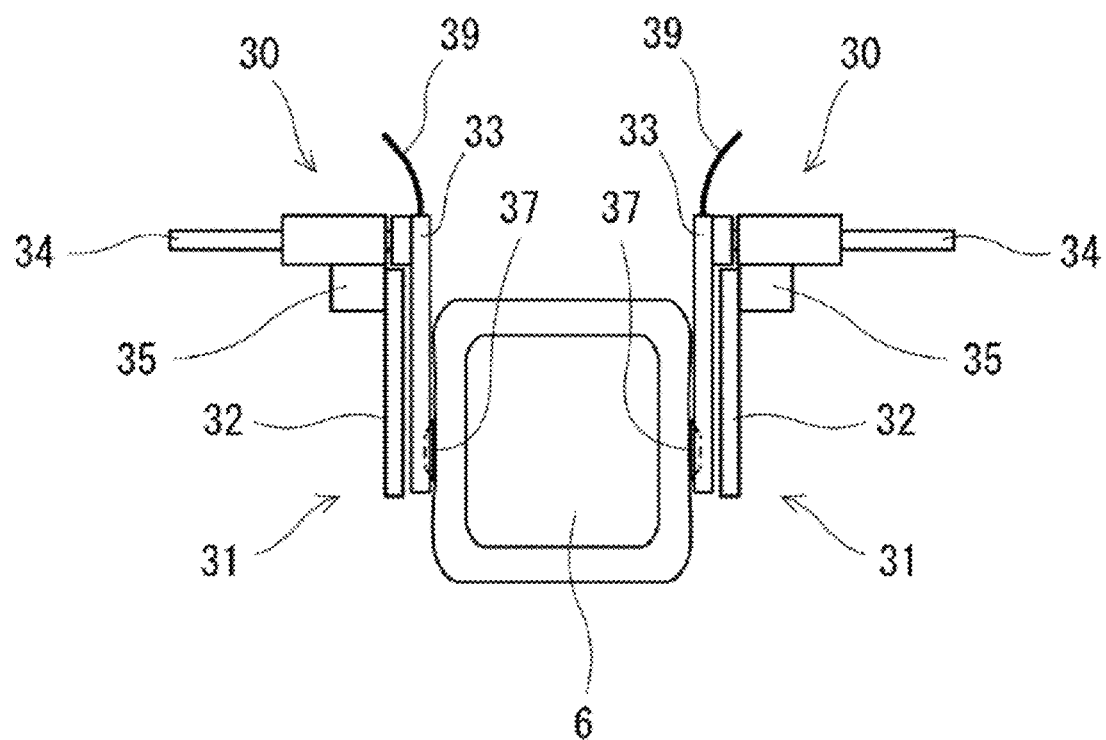

FIG. 8 is a front view illustrating a second hand 30, which is the first hand 20 illustrated in FIGS. 3(A) and 3(B) additionally provided with a sucking function. FIGS. 9(A) and 9(B) are enlarged views illustrating a sucking mechanism of the second hand 30 illustrated in FIG. 8, where FIG. 9(A) is a front view of Example 1, and FIG. 9(B) is a front view of Example 2. FIGS. 10(A) and 10(B) are views illustrating a state in which the second hands 30 illustrated in FIG. 8 hold the second holdable object 6, where FIG. 10(A) is a plan view, and FIG. 10(B) is a front view.

In FIGS. 8 and 9(A), a sucking hole 36 is formed inside a movable plate 33 provided to a holding part or holder 31, and a suction pad 37 is provided as a suction part at an end part on an outer surface of the movable plate 33. The suction pad 37 and the sucking hole 36 communicate with each other, and the sucking hole 36 is connected to a suction pipe 39 at its rear-end part. The suction pipe 39 is connected to a suction device 80 such as a vacuum pump or suction generator. According to this, when the second holdable object 6 is held by outer surfaces of the respective movable plates 33, it can be appropriately held while being sucked by the suction pads 37 even when a surface of the second holdable object 6 is made of soft material (e.g., nylon).

Note that as illustrated in FIG. 9(B), a plurality of suction holes 38 communicating with the sucking hole 36 may be provided instead of the suction pad 37. The configuration of the sucking function is not limited to this.

A "holding" of the holdable object 6 (5) by sucking it as used herein and in the appended claims includes the holding of the holdable object 6 (5) by the suction part (the suction pad 37, the suction holes 38, and a suction pad 48 (described later)), and also includes the holding of the holdable object 6 (5) by the suction part (37, 38, 48) as well as the holding part or holder 31 (41).

As illustrated in FIGS. 10(A) and 10(B), the second hands 30 can hold the second holdable object 6 while the suction pads 37 provided to the outer surfaces of the movable plates 33, respectively, suck the second holdable object 6. In this embodiment, since the second holdable object 6 is sucked by the suction pads 37, the second holdable object 6 can be stably held even when the surface of the second holdable object 6 deforms during the change in its position.

Note that although in this example the suction pad 37 is provided to the movable plate 33, the suction pad 37 may be provided to the fixed plate 22 on the movable plate 33 side. According to this, the first holdable object 5 can be sucked when it is held by one hand as illustrated in FIGS. 5(A) and 5(B).

(Example of Third Hand with Sucking Function)

Figure 11A:
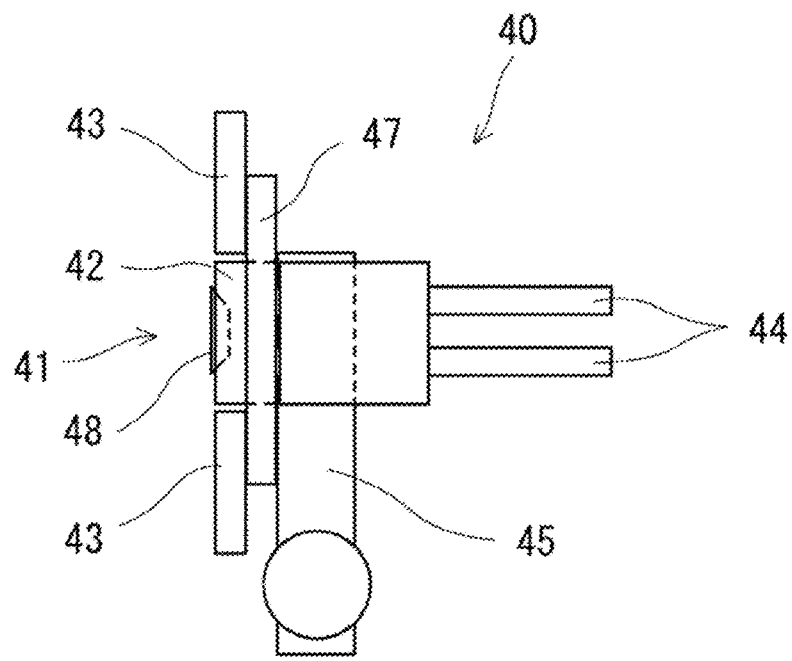
FIGS. 11(A) and 11(B) are views illustrating a third hand provided with a sucking function different from the sucking function illustrated in FIG. 8, where
Figure 11B:
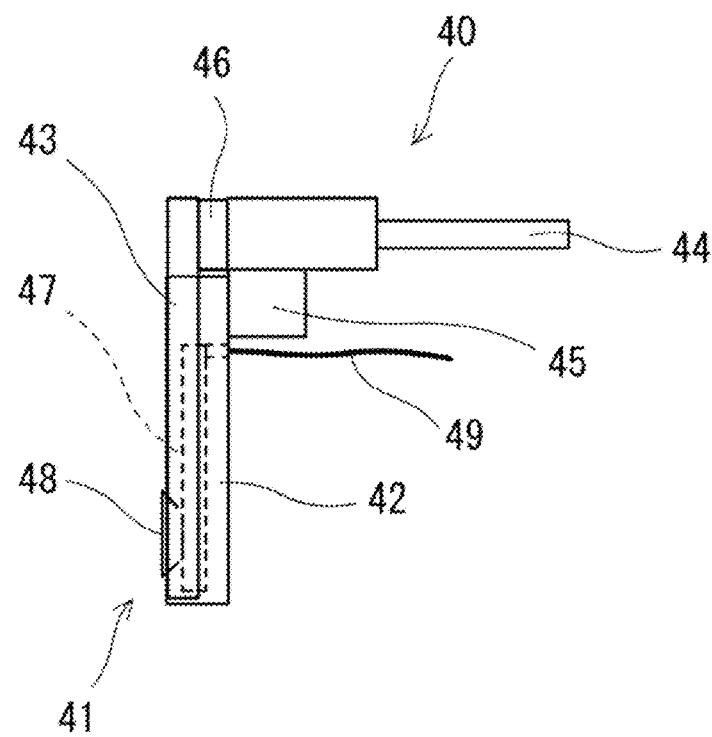
Figure 12A:
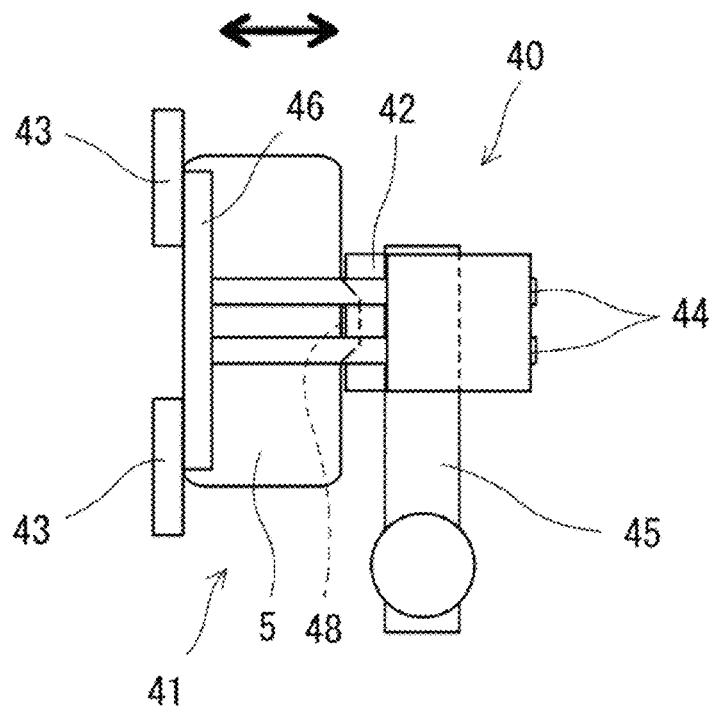
FIGS. 12(A) and 12(B) are views illustrating a state in which the third hand holds the holdable object, where
Figure 12B:
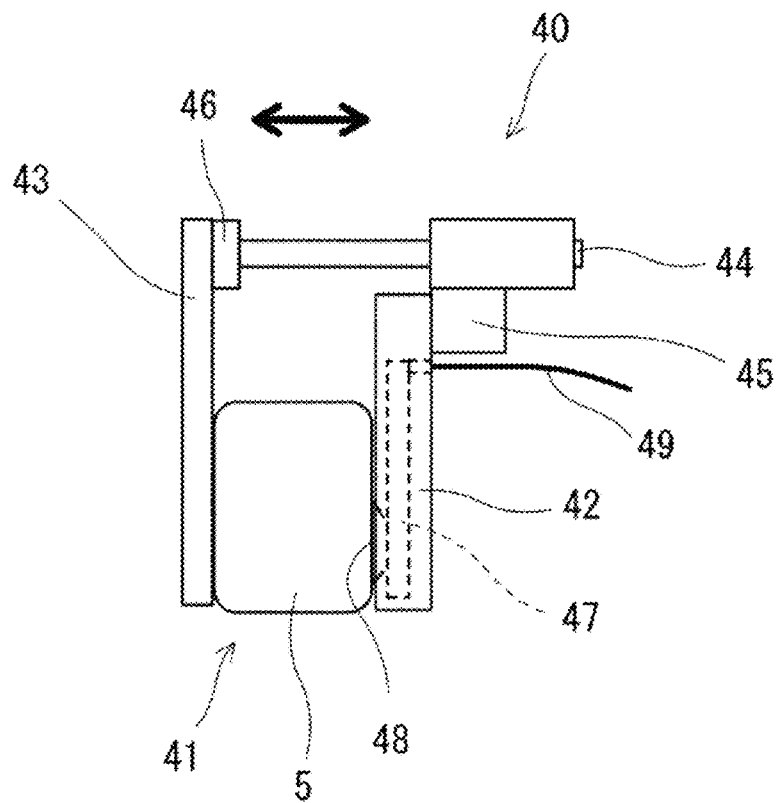

FIGS. 11(A) and 11(B) are views illustrating a third hand 40 provided with a sucking function different from the sucking function illustrated in FIG. 8, where FIG. 11(A) is a plan view, and FIG. 11(B) is a front view. FIGS. 12(A) and 12(B) are views illustrating a state in which the third hand 40 illustrated in FIGS. 11(A) and 11(B) holds the first holdable object 5, where FIG. 12(A) is a plan view, and FIG. 12(B) is a front view.

As illustrated in FIGS. 11(A) and 11(B), a holding part or holder 41 of the third hand 40 is provided with movable plates 43 adjacent to a fixed plate 42 on both sides. The movable plates 43 are coupled to each other by a coupling member or coupler 46, and this coupling member 46 is reciprocatable by holding cylinders 44. Thus, the movable plates 43 parallelly open and close with respect to the fixed plate 42. When the movable plates 43 are retreated by the holding cylinders 44, they are positioned in line with the fixed plate 42 on both sides. That is, the movable plates 43 are disposed in line with the fixed plate 42 on both sides when they are closed. The fixed plate 42 is provided with a sucking function. In this example, a sucking hole 47 is formed in an intermediate part of the fixed plate 42, and the fixed plate 42 is provided with the suction pad 48 as the suction part at an end part of the sucking hole 47 in an open-and-close direction of the movable plates 43. The sucking hole 47 is connected at its rear-end part to a suction pipe 49 which sucks in a vacuum state.

As illustrated in FIGS. 12(A) and 12(B), the third hand 40 according to this embodiment can hold the first holdable object 5 by inner surfaces of the fixed plate 42 and the movable plates 43 of one hand while the movable plates 43 open. Moreover, since the sucking through the suction pipe 49 provided to the fixed plate 42 makes the suction pad 48 in a vacuum state, the first holdable object 5 can also be sucked by the suction pad 48. Therefore, according to this example, the first holdable object 5 having a soft surface can be held by one hand.

(Example of Fourth Hand with Sucking Function)

Figure 13A:
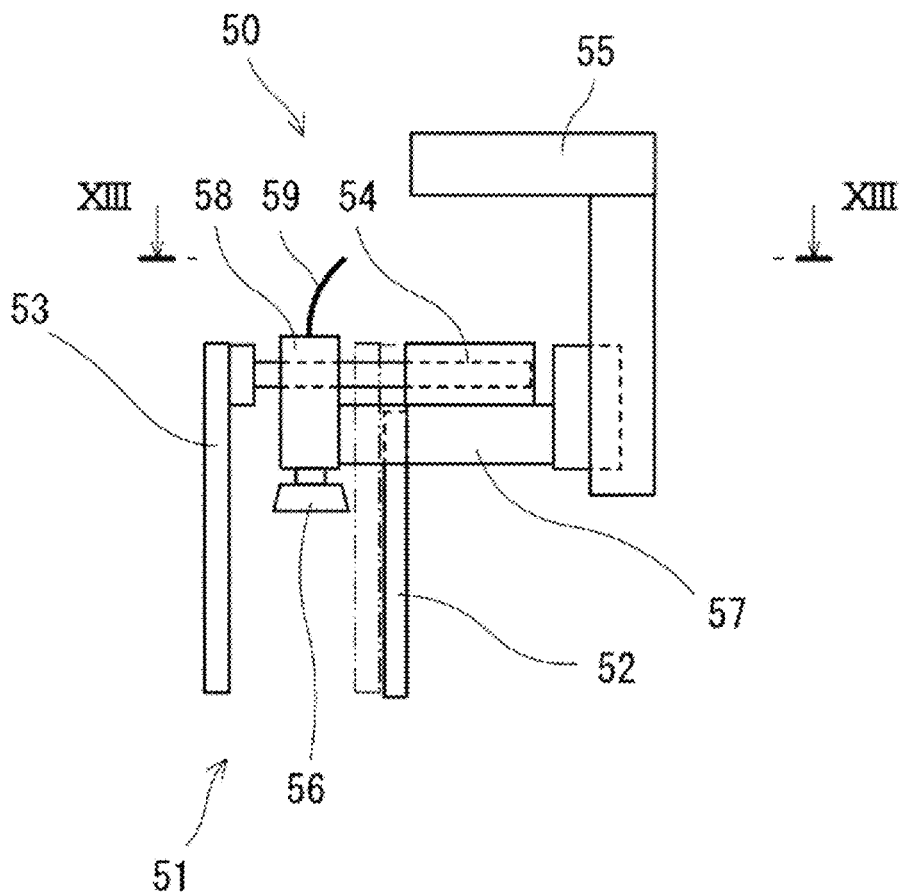
FIGS. 13(A) and 13(B) are views illustrating the fourth hand provided with a sucking function different from the sucking function illustrated in FIG. 8, where
Figure 13B:
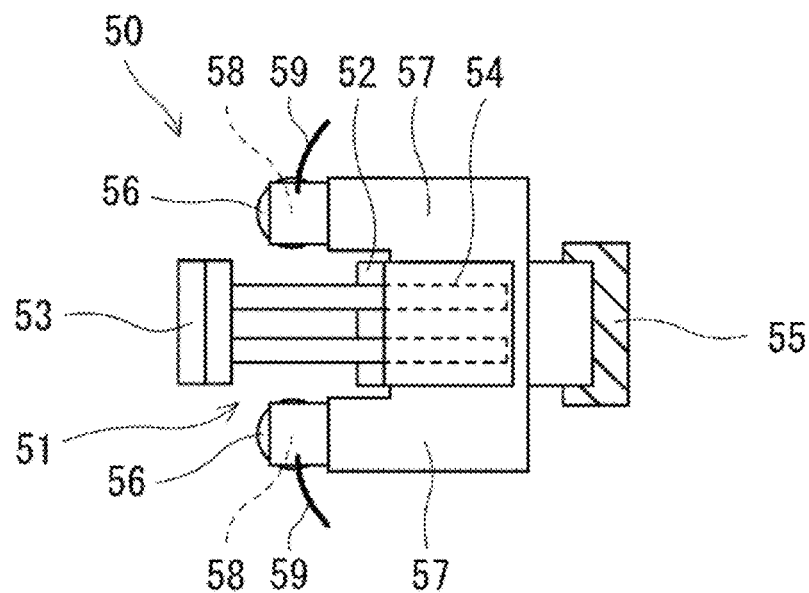
Figure 14A:
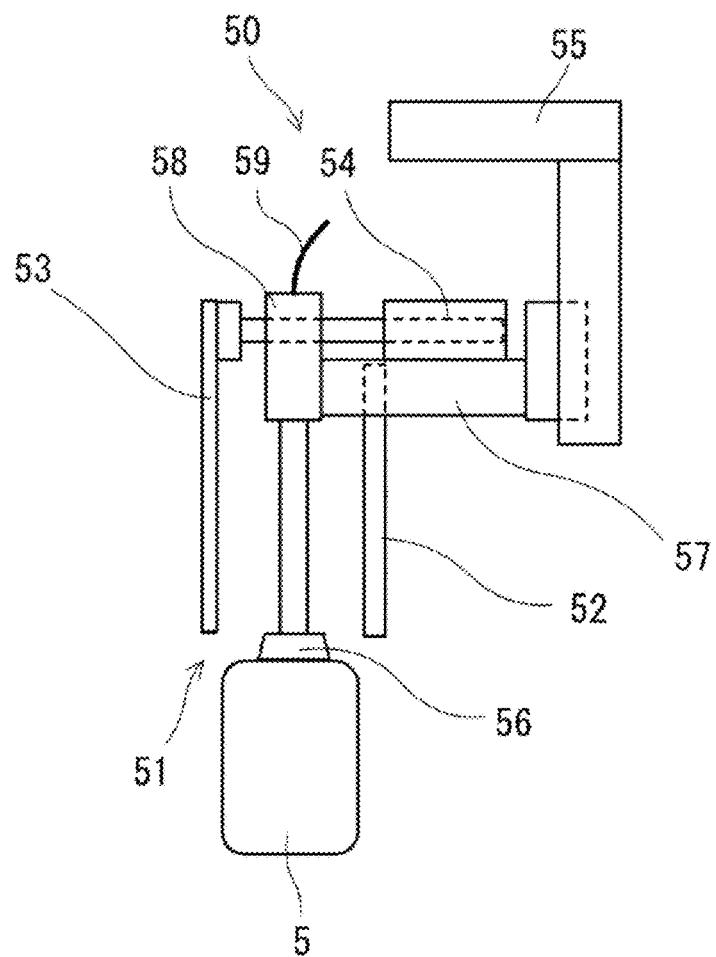
FIGS. 14(A) and 14(B) are views illustrating a state in which the fourth hand (one hand) illustrated in FIGS. 13(A) and 13(B) holds the holdable object, where
Figure 14B:
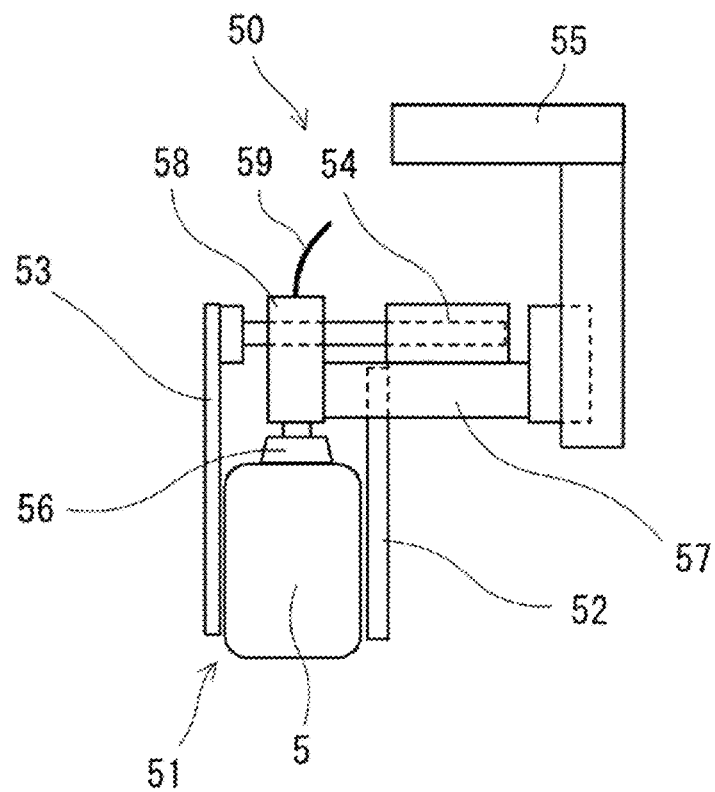
Figure 15A:
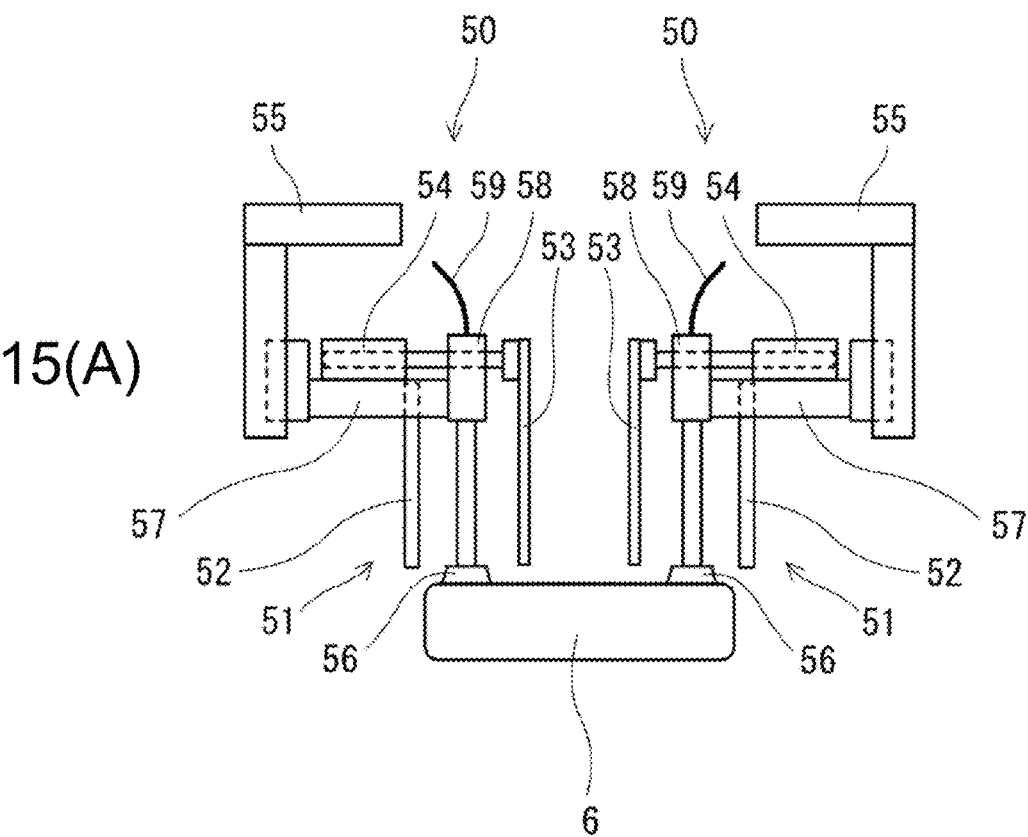
FIGS. 15(A) and 15(B) are views illustrating a state in which the fourth hands (both hands) illustrated in FIGS. 13(A) and 13(B) hold the holdable object, where
Figure 15B:
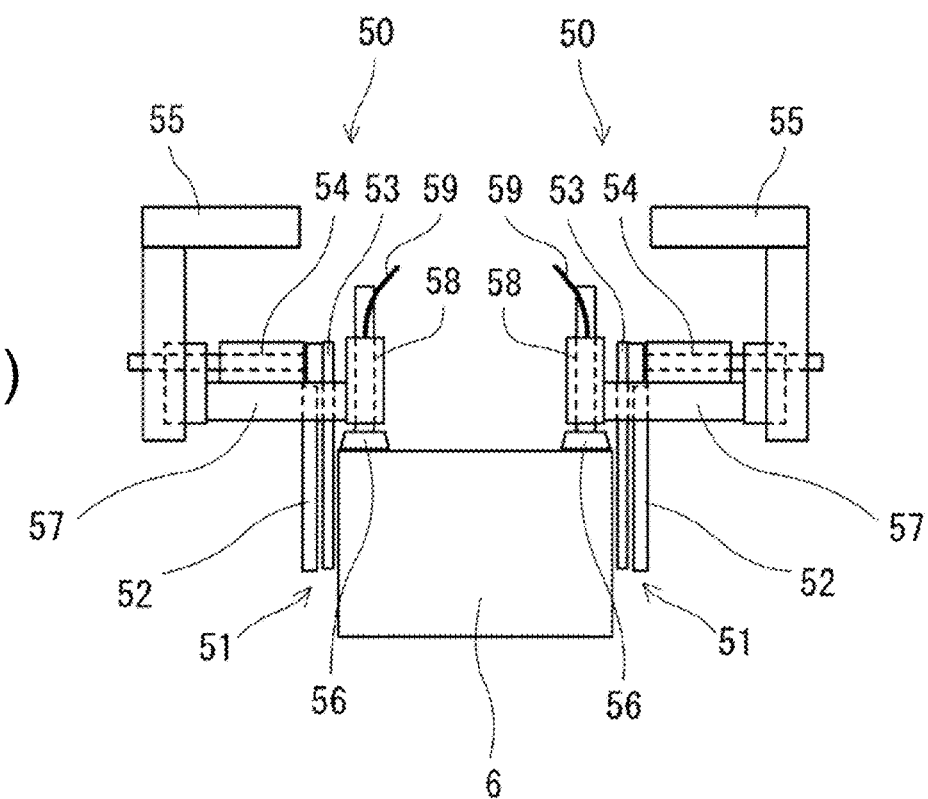

FIGS. 13(A) and 13(B) are views illustrating a fourth hand 50 provided with a sucking function different from the sucking function illustrated in FIG. 8, where FIG. 13(A) is a plan view, and FIG. 13(B) is a cross-sectional view taken along a line XIII-XIII in FIG. 13(A). FIGS. 14(A) and 14(B) are views illustrating a state in which the fourth hand 50 illustrated in FIGS. 13(A) and 13(B) holds the holdable object by one hand, where FIG. 14(A) is a front view when holding the holdable object only by the sucking function, and FIG. 14(B) is a front view when holding the holdable object by both of the sucking function and the holding function. FIGS. 15(A) and 15(B) are views illustrating a state in which the fourth hands 50 illustrated in FIGS. 13(A) and 13(B) hold the holdable object by both hands, where FIG. 15(A) is a front view when holding the holdable object only by the sucking function, and FIG. 15(B) is a front view when holding the holdable object by both of the sucking function and the holding function.

As illustrated in FIGS. 13(A) and 13(B), a configuration of the fourth hand 50 in this embodiment is the same as the first hand 20 in that a movable plate 53 opens and closes with respect to a fixed plate 52. The fourth hand 50 is provided with suction nozzles 56 as the suction part, which are vertically reciprocatable toward the first holdable object 5 in the front-and-rear direction of the movable plate 53. An end of each suction nozzle 56 is formed by soft material such as rubber or foam so that it can suck the holdable object 5 (6). The suction nozzles 56 are provided to projecting parts 57 projecting forward from a fourth link 55 having holding cylinders 54. Each suction nozzle 56 is reciprocatable by a reciprocating cylinder 58 in the vertical direction intersecting with the open-and-close direction of the movable plate 53.

As illustrated in FIG. 14(A), when the smaller first holdable object 5 is larger in weight, the fourth hand 50 can advance the suction nozzles 56 toward the first holdable object 5 by the reciprocating cylinders 58 while the movable plate 53 opens. Then, as illustrated in FIG. 14(B), the reciprocating cylinders 58 are retreated so that the first holdable object 5 is positioned between the fixed plate 52 and the movable plate 53. Then, the holding cylinders 54 are retreated so that the first holdable object 5 is sandwiched and held between the fixed plate 52 and the movable plate 53. Therefore, the first holdable object 5 larger in weight can be appropriately held with one hand by the suction force of the suction nozzles 56 and the holding force of the fixed plate 52 and the movable plate 53.

Moreover, according to the fourth hand 50, as illustrated in FIG. 15(A), even when the larger second holdable object 6 is thin and has a soft surface, the suction nozzles 56 of both hands are extended so that the suction nozzles 56 suck and hold the second holdable object 6.

Moreover, according to the fourth hand 50, as illustrated in FIG. 15(B), even when the second holdable object 6 is larger in weight, the second holdable object 6 can be held by outer surfaces of the movable plates 53 of both hands, while the movable plates 53 are retreated to be closed, and the suction nozzles 56 of both hands suck the second holdable object 6. Therefore, the heavy second holdable object 6 can be appropriately held with both hands by the suction force of the suction nozzles 56 and the holding force of holding parts or holders 51. The usage of the fourth hand 50 illustrated in the drawings is one example, and the sucking by the suction nozzles 56 and the holding by the holding part(s) 51 may be combined according to the holdable objects 5 and 6.

(Conclusion)

As described above, according to the robot system 1, when the number of hands (20, 30, 40, 50) determined based on the size of the holdable object (5, 6) is one, one holding part (21, 31, 41, 51) is controlled to open so as to hold the holdable object (5, 6) by the inner surface of the holding part (21, 31, 41, 51). Moreover, when the determined number of hands (20, 30, 40, 50) is two, two holding parts (21, 31, 41, 51) are controlled to close so as to hold the holdable object (5, 6) by the outer surfaces of the respective holding parts (21, 31, 41, 51). Therefore, the holdable object (5, 6) can be promptly held and changed in its position according to the size of the holdable object (5, 6) by the two holding parts (21, 31, 41, 51). As a result, the holdable objects 5 and 6 having different sizes can be efficiently changed in their positions, for example.

(One Example of Processing Performed by Control Device)

Figure 16:
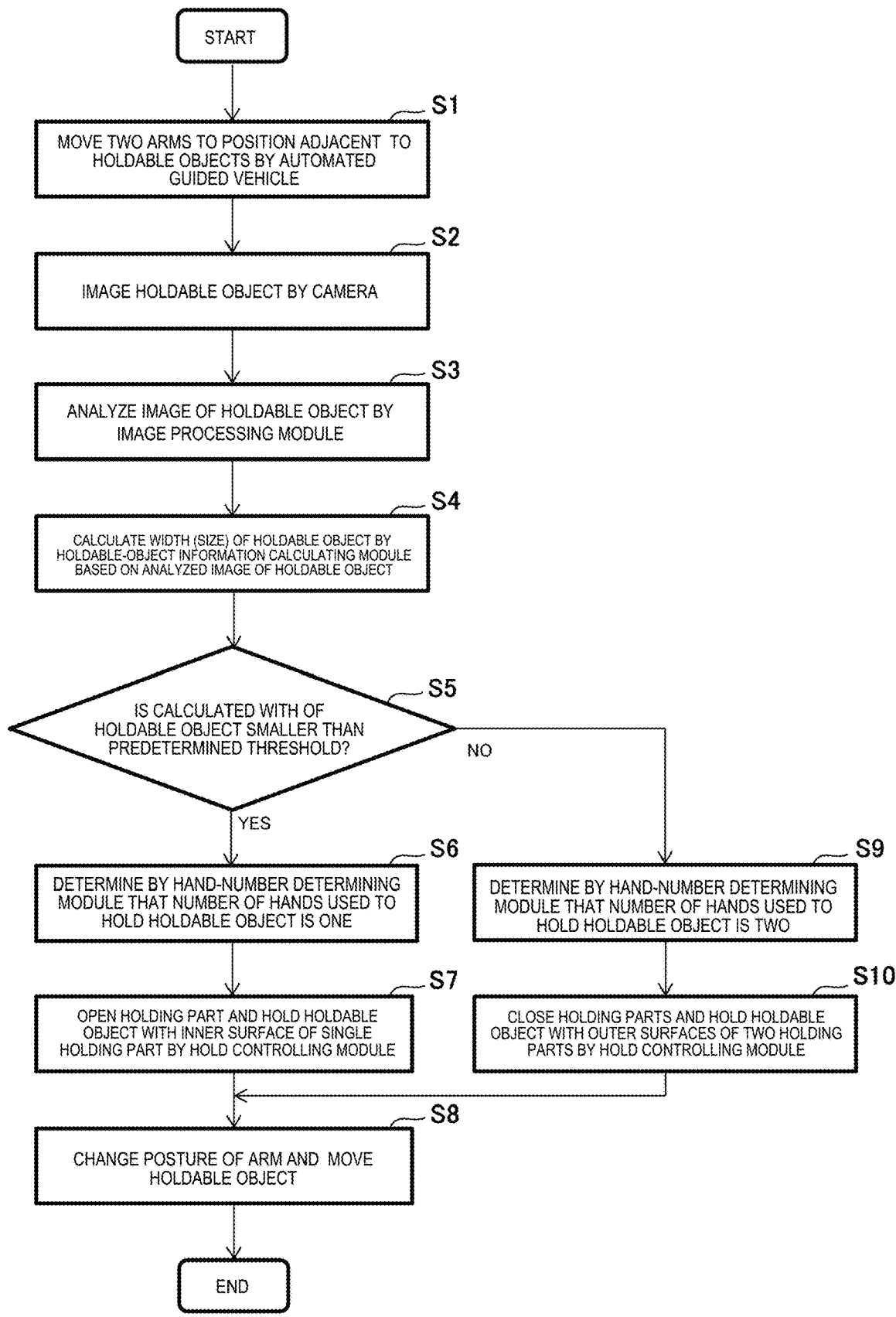
FIG. 16 is a flowchart showing one example of processing performed by the control device of the robot system according to one embodiment of the present invention.

One example of processing performed by the control device 70 of the robot system 1 described above based on FIGS. 1 to 7 will be described based on a flowchart shown in FIG. 16. FIG. 16 is the flowchart showing one example of the processing performed by the control device of the robot system according to one embodiment of the present invention.

First, the control device 70 moves the first and second arms 12 and 13 (two arms) by the automated guided vehicle 2 to a position adjacent to the first and second holdable objects 5 and 6 (holdable objects) (in other words, a position adjacent to the first and second trays 60 and 61) (Step S1 in FIG. 16).

Next, the control device 70 images, for example, the first holdable object 5 by the stereo camera 3 (camera) (Step S2 in FIG. 16). At this time, for example, the stereo camera 3 is provided above the pedestal 11 of the robot 10 on the rear side, and therefore, can three dimensionally image the first holdable object 5.

Moreover, the control device 70 analyzes the image of the first holdable object 5 by the image processing module 75 (Step S3 in FIG. 16).

Then, based on the analyzed image of the first holdable object 5, the control device 70 calculates the width (size) of the first holdable object 5 by the holdable-object information calculating module 76 (Step S4 in FIG. 16). It should be noted that the width of the first holdable object 5 herein denotes a length of the first holdable object 5 in a direction in which the first tray 60 and the second tray 61 are lined up as shown in FIG. 1, i.e., in a direction in which the holding part 21 opens or closes when the single first hand 20 holds the first holdable object 5.

Next, the control device 70 determines by the hand-number determining module 73 whether or not the calculated width of the first holdable object 5 is smaller than a predetermined threshold (Step S5 in FIG. 16). It should be noted that the predetermined threshold is preset to be larger than the width of the first holdable object 5 and smaller than the width of the second holdable object 6.

Herein, it is determined that the calculated width of the first holdable object 5 is smaller than the predetermined threshold (YES in Step S5 of FIG. 16). Therefore, the control device 70 determines by the hand-number determining module 73 that the number of first hands 20 used to hold the first holdable object 5 is one (Step S6 in FIG. 16).

Then, the control device 70 opens the holding part 21 and holds the first holdable object 5 with the inner surface of the single holding part 21 by the hold controlling module 74 (Step S7 in FIG. 16).

Finally, the control device 70 changes the posture of the first arm 12 (arm) and moves the first holdable object 5 to the third tray 63 (Step S8 in FIG. 16).

It should be noted that when the control device 70 images the second holdable object 6 by the stereo camera 3 in Step S2, the control device 70 performs, in Steps S3 to S5, the same processing as when the control device images the first holdable object 5 by the stereo camera 3 in Step S2. Then, it is determined in Step S5 that the calculated width of the second holdable object 6 is larger than the predetermined threshold (NO in Step S5 of FIG. 16). Therefore, the control device 70 determines by the hand-number determining module 73 that the number of first hands 20 used to hold the second holdable object 6 is two (Step S9 in FIG. 16). Then, the control device 70 closes the holding parts 21 and holds the second holdable object 6 with the outer surfaces of the two holding parts 21 by the hold controlling module 74 (Step S10 in FIG. 16). Finally, the control device 70 changes the postures of the first and second arms 12 and 13 (arms) and moves the second holdable object 6 to the third tray 63 (Step S8 in FIG. 16).

For example, as described above, the robot system according to the present disclosure is controlled such that: when the number of hands determined based on the size of the holdable object is one, the holding part opens and holds the holdable object; and when the number of hands determined based on the size of the holdable object is two, the two holding parts close and hold the holdable object. With this, the robot system according to the present disclosure can, for example, promptly hold the holdable object and change the position of the holdable object by the holding parts of the two hands in accordance with the size of the holdable object.

The foregoing has described a case where in Step S4, the control device 70 calculates the width of the first holdable object 5 (or the width of the second holdable object 6) by the holdable-object information calculating module 76 based on the analyzed image of the first holdable object 5 (or the second holdable object 6). However, the present invention is not limited to this. For example, when holding the first holdable object 5 by the single holding part 21, the height or depth of the first holdable object 5 may be calculated by the holdable-object information calculating module 76 in accordance with a direction in which the holding part 21 opens or closes. The same is true when holding the second holdable object 6 by the two hands 20, and therefore, the repetition of the same explanation is avoided.

(Other Modifications)

In the embodiment described above, the hand (20, 30, 40, 50) is provided with the holding part (21, 31, 41, 51) including the fixed plate (22, 32, 42, 52) and the movable plate (23, 33, 43, 53) each in the plate-like shape. However, the holding part (21, 31, 41, 51) is not limited to have a plate-like shape as long as it is openable and closable, and not limited to the embodiment described above.

Moreover, a member or surface (e.g., a rubber material) which increases a frictional resistance may be provided to a surface of the holding part (21, 31, 41, 51) on which the holdable object (5, 6) is held.

Moreover, the robot 10 is one example, and not limited to the dual-arm robot 10. For example, the robot 10 may be comprised of two robots 10 which control the two hands 20 and 30, respectively.

A non-limiting exemplary purpose of the present disclosure is to provide a robot system capable of efficiently holding a holdable object of various sizes and changing a position thereof while appropriately selecting a hand to be used among two hands.

According to the disclosure, the robot controlling module or circuitry determines the number of hands used to hold the holdable object by the hand-number determining module or circuitry based on the size of the holdable object. When the number of hands is one, the holding part of one of the hands is controlled by the hold controlling module or circuitry to open so as to hold the holdable object by an inner surface of the holding part, and when the number of hands is two, the holding parts of the two hands are controlled to close so as to hold the holdable object by outer surfaces of the holding parts. Therefore, the holdable object can be promptly held and changed in its position according to the size of the holdable object by using the different surfaces of the holding parts.

Moreover, the robot system may further include a camera to image the holdable object, and an image processing module or circuitry configured to analyze an image captured by the camera. The robot controlling module or circuitry may calculate by a holdable-object information calculating module or circuitry at least the size of the holdable object based on the image processed by the image processing module or circuitry, and determine by the hand-number determining module or circuitry the number of hands based on the calculated size of the holdable object According to this configuration, the size of the holdable object is calculated based on the result of analyzing the image captured by the camera, and whether to hold the holdable object by one hand or by two hands is determined according to the size of the holdable object, and thus, the holdable object can be efficiently held and changed in its position.

Moreover, the holding part may include two holding plates configured to parallelly open and close while facing to each other. When the hand-number determining module or circuitry determines that the holdable object is held by one of the hands, the robot controlling module or circuitry may open the holding plates of the hand so as to hold the holdable object by inner surfaces of the holding plates.

According to this configuration, when the holdable object is held by one hand, the holding part opens and the holdable object can be efficiently held by the inner surfaces of the holding plates. In addition, even when the plurality of holdable objects are lined up, the holding plates can be inserted between the holdable objects so as to hold it.

Moreover, the holding part may include two holding plates configured to parallelly open and close while facing to each other. When the hand-number determining module or circuitry determines that the holdable object is held by the two hands, the robot controlling module or circuitry may close the holding plates of the two hands so as to hold the holdable object by outer surfaces of the holding plates of the two hands.

According to this configuration, when the holdable object is held by two hands, the holding parts close and the holdable object can be efficiently held by the outer surfaces of the holding plates. In addition, even when the plurality of holdable objects are lined up, the holding plates can be inserted between the holdable objects so as to hold it.

Moreover, the robot system may further include a suction part configured to suck the holdable object near the holding part.

According to this configuration, even when the surface of the holdable object is made of soft material, the object can be sucked and held with the suction part. The "holding" here includes the holding of the holdable object by the suction part, and also includes the holding of the holdable object by the suction part as well as the holding by the holding part.

Moreover, the suction part may include a suction pad provided to a surface of the holding part by which the holdable object is held. The robot system may further include a suction device configured to suck through the suction pad.

According to this configuration, the holdable object can be held appropriately even when the surface of the holdable object may deform by the sucking through the suction pad during the holding operation of the holdable object by the holding part.

Moreover, the suction part may include a suction hole formed in a surface of the holding part by which the holdable object is held. The robot system may further include a suction device configured to suck through the suction hole.

According to this configuration, the holdable object can be held appropriately even when the surface of the holdable object may deform by the sucking through the suction hole during the holding operation of the holdable object by the holding part.

Moreover, the holding part may include a fixed plate, and movable plates disposed in line with the fixed plate on both sides. The movable plates may parallelly open and close with respect to the fixed plate, and may be positioned in line with the fixed plate on both sides when the movable plates close. The fixed plate may be provided with the suction part in a direction in which the movable plates open and close.

According to this configuration, since the holding part is in a state where the movable plates are positioned in line with the fixed plate when the movable plates close, the holdable object can be sucked and held by the suction part provided to the fixed plate between the movable plates. In addition, even when the movable plates open, the holdable object can be sucked and held by the suction part provided to the fixed plate. Therefore, the holdable object can be sucked and held by either two hands or one hand.

Moreover, the suction part may have a suction nozzle configured to be reciprocatable in a direction intersecting with an open-and-close direction of the holding part. According to the weight of the holdable object held by the holding part, the suction nozzle may be advanced toward the holdable object and suck the holdable object.

According to this configuration, for example, when the holdable object is large in weight, by sucking the holdable object by the suction nozzle while the holding part holds the holdable object, the holdable object can be held with the large force and changed in its position.

Moreover, the two arms may be adapted to be a dual arm configured to be rotatable about a first axis defined on a pedestal.

According to this configuration, with the dual-arm robot provided to one pedestal, the operation of opening one holding part provided to one of the two arms so as to hold the holdable object and the operation of closing two holding parts provided to both of the two arms so as to hold the holdable object, can be efficiently performed. Thus, the holdable objects having different sizes can be promptly held and changed in their positions.

According to the present disclosure, when the number of hands determined based on the size of a holdable object is one, a holding part is controlled to open so as to hold the holdable object, and when the number of hands is two, the holding parts are controlled to close so as to hold the holdable object by the two holding parts. Therefore, the holdable object can be promptly held and changed in its position according to the size thereof by using the holding parts of the two hands.

The functionality of the elements, modules, and processors disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, modules, or units are a combination of hardware and software, the software being used to configure the hardware and/or processor.

The embodiment described above is merely an illustration and various changes are possible without departing from the subject matter of the present disclosure. The present disclosure is not limited to the embodiment described above.

DESCRIPTION OF REFERENCE CHARACTERS

1 Robot System
2 Automated Guided Vehicle
3 Stereo Camera
5 First Holdable Object
6 Second Holdable Object
10 Robot
11 Pedestal
12 First Arm
13 Second Arm
20 First Hand
21 Holding Part or Holder
22 Fixed Plate
23 Movable Plate
24 Holding Cylinder
30 Second Hand
31 Holding Part or Holder
32 Fixed Plate
33 Movable Plate
34 Holding Cylinder
36 Sucking Hole
37 Suction Pad
38 Suction Hole
40 Third Hand
41 Holding Part or Holder
42 Fixed Plate
43 Movable Plate
44 Holding Cylinder
47 Sucking Hole
48 Suction Pad
50 Fourth Hand
51 Holding Part or Holder
52 Fixed Plate
53 Movable Plate
54 Holding Cylinder
56 Suction Nozzle
58 Reciprocating Cylinder
70 Control Device or Circuitry
71 Memory
72 Robot Controlling Module or Circuitry
73 Hand-Number Determining Module or Circuitry
74 Hold Controlling Module or Circuity
75 Image Processing Module or Circuitry
76 Holdable-Object Information Calculating Module or Circuitry

What is claimed is:

1. A robot system, comprising:
two arms, each having a hand at an end thereof; and
robot controlling circuitry configured to control operation of the arms,
wherein each of the hands has an operable and closable holder, and
wherein the robot controlling circuitry includes:
hand-number determining circuitry configured to determine a number of hands used to hold a holdable object based on a size of the holdable object; and
hold controlling circuitry configured to control the holder of one of the hands to open so as to hold the holdable object by an inner surface of the holder, when the number of hands determined by the hand-number determining circuitry is one, and control the holders of the two hands to close so as to hold the holdable object by outer surfaces of the two holders, when the number of hands determined by the hand-number determining circuitry is two,
wherein:
each of the holders includes two holding plates to parallelly open and close while facing each other,
when the hand-number determining circuitry determines that the holdable object is to be held by one of the hands, the robot controlling circuitry opens the holding plates of the holder of the one hand in order to hold the holdable object by inner surfaces of the holding plates of the holder of the one hand, and
when the hand-number determining circuitry determines that the holdable object is to be held by the two hands, the robot controlling circuitry controls the two hands to use an outer surface of at least one of the holding plates of each of the two holders of the two hands to hold the holdable object.

2. The robot system of claim 1, further comprising:
a camera to image the holdable object; and
image processing circuitry configured to analyze an image captured by the camera,
wherein the robot controlling circuitry calculates by a holdable-object information calculating circuitry at least the size of the holdable object based on the image processed by the image processing circuitry, and determines by the hand-number determining circuitry the number of hands based on the calculated size of the holdable object.

3. The robot system of claim 1, further comprising:
a suction structure to suck the holdable object near the holder.

4. The robot system of claim 3, wherein:
the suction structure includes a suction pad at a surface of the holder by which the holdable object is held, and
the robot system further comprises a suction generator to suck through the suction pad.

5. The robot system of claim 3, wherein:
the suction structure includes a suction hole in a surface of the holder by which the holdable object is held, and
the robot system further comprises a suction generator to suck through the suction hole.

6. The robot system of claim 3, wherein:
the two holding plates of each of the holders include a fixed plate, and a movable plate disposed in line with the fixed plate on an opposite side of the fixed plate,
the movable plates parallelly open and close with respect to the fixed plate, and are positioned in line with the fixed plate on the opposite sides when the movable plates close, and
the fixed plate includes a suction pad facing in a direction of a corresponding one of the movable plates.

7. The robot system of claim 3, wherein:
the suction structure includes a suction nozzle to be reciprocatable in a direction intersecting with an open-and-close direction of the holder, and according to a weight of the holdable object held by the holder, the suction nozzle is advanced toward the holdable object and sucks the holdable object.

8. The robot system of claim 1, wherein:
the two arms have a dual arm configuration which is rotatable about a first axis defined on a pedestal.

9. The robot system of claim 1, wherein:
when the hand-number determining circuitry determines that the holdable object is to be held by the two hands, the robot controlling circuitry controls the hands to use an outer surface of only one of the holding plates of each of the two hands to hold the holdable object.

10. The robot system of claim 1, wherein:
when the hand-number determining circuitry determines that the holdable object is to be held by the two hands, the robot controlling circuitry controls the hands to use an outer surface of only one of the holding plates of each of the two hands to hold the holdable object by pushing on the holdable object from opposite sides.

11. A robot system, comprising:
two arms, each having a hand at an end thereof; and
a robot controller to control operation of the arms,
wherein each of the hands has an openable and closable holder, and
wherein the robot controller includes:
means for determining a number of hands used to hold a holdable object based on a size of the holdable object; and
means for controlling the holder of one of the hands to open so as to hold the holdable object by an inner surface of the holder, when the number of hands determined by the means for determining the number of hands is one, and control the holders of the two hands to close so as to hold the holdable object by outer surfaces of the two holders, when the number of hands determined by the means for determining the number of hands is two,
each of the holders includes two holding plates to parallelly open and close while facing each other,
when the means for determining the number of hands determines that the holdable object is to be held by one of the hands, the robot controller opens the holding plates of the holder of the one hand in order to hold the holdable object by inner surfaces of the holding plates of the holder of the one hand, and
when the means for determining the number of hands determines that the holdable object is to be held by the two hands, the robot controller controls the hands to use an outer surface of at least one of the holding plates of each of the two holders of the two hands to hold the holdable object.

12. The robot system of claim 11, further comprising:
a camera to image the holdable object; and
means for analyzing an image captured by the camera,
wherein the robot controller calculates by a means for calculating at least the size of the holdable object based on the image processed by the means for analyzing, and determines by the means for determining the number of hands the number of hands based on the calculated size of the holdable object.

13. The robot system of claim 11, further comprising:
a suction structure to suck the holdable object near the holder.

14. The robot system of claim 13, wherein:
the suction structure includes a suction pad at a surface of the holder by which the holdable object is held, and
the robot system further comprises a suction generator to suck through the suction pad.

15. The robot system of claim 13, wherein:
the suction structure includes a suction hole in a surface of the holder by which the holdable object is held, and
the robot system further comprises a suction generator to suck through the suction hole.

16. The robot system of claim 13, wherein:
the two holding plates of each of the holders include a fixed plate, and a movable plate disposed in line with the fixed plate on an opposite side of the fixed plate,
the movable plates parallelly open and close with respect to the fixed plate, and are positioned in line with the fixed plate on the opposite sides when the movable plates close, and
the fixed plate includes a suction pad facing in a direction of a corresponding one of the movable plates.

17. The robot system of claim 13, wherein:
the suction structure includes a suction nozzle to be reciprocatable in a direction intersecting with an open-and-close direction of the holder, and
according to a weight of the holdable object held by the holder, the suction nozzle is advanced toward the holdable object and sucks the holdable object.

18. The robot system of claim 11, wherein:
the two arms have a dual arm configuration which is rotatable about a first axis defined on a pedestal.

19. The robot system of claim 11, wherein:
when the means for determining the number of hands determines that the holdable object is to be held by the two hands, the robot controller controls the hands to use an outer surface of only one of the holding plates of each of the two hands to hold the holdable object.

20. The robot system of claim 11, wherein:
when the means for determining the number of hands determines that the holdable object is to be held by the two hands, the robot controller controls the hands to use an outer surface of only one of the holding plates of each of the two hands to hold the holdable object by pushing on the holdable object from opposite sides.

* * * * *